E. GUITTARD.
Tin-Pail.

No. 214,819. Patented April 29, 1879.

Witnesses
Fred G. Dieterich
J. Walter Fowler

Inventor
Etienne Guittard
By Jos. J. Stewart
Attorney

UNITED STATES PATENT OFFICE.

ETIENNE GUITTARD, OF SAN FRANCISCO, CALIFORNIA.

IMPROVEMENT IN TIN PAILS.

Specification forming part of Letters Patent No. 214,819, dated April 29, 1879; application filed March 12, 1879.

*To all whom it may concern:*

Be it known that I, ETIENNE GUITTARD, of the city of San Francisco, in the State of California, have invented a new and useful Improvement in Tin Pails, of which the following is a specification.

The invention relates to tin pails intended to be used primarily as commercial packages, and, after being emptied of their purchasable contents, to be utilized for domestic or camp purposes.

The object of my invention is to provide in a convenient and attractive form a combination utensil especially adapted to mining and frontier life, which may be used in the first instance as a package for coffee, tea, or other article of commerce, and afterward used as a pail for fluids, canister for coffee, or as a coffee-pot for boiling and straining roasted and ground coffee, together with supplying, by means of its double screw lid and stopper, a strainer and a self-heating drinking-cup, and, by a concave depression in the bottom of the pail, a dish or plate for solid food; and, finally, it consists in the particular construction and arrangement of the several parts.

Figure 1:
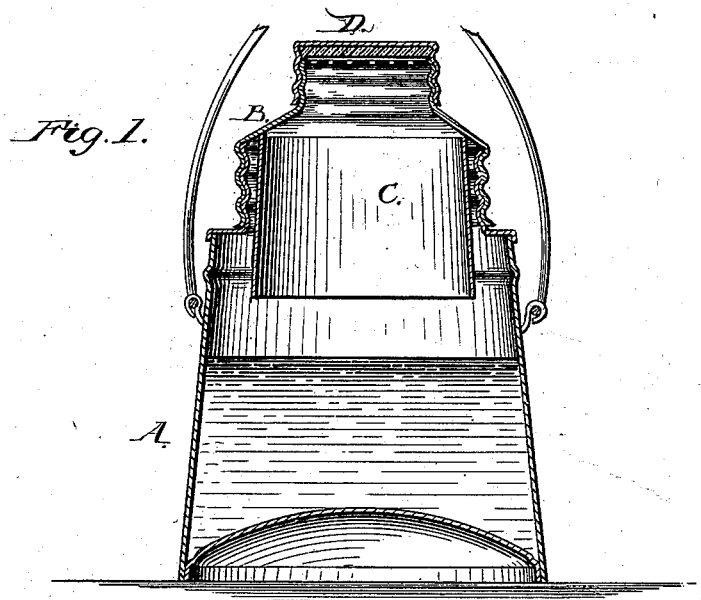
Figure 2:
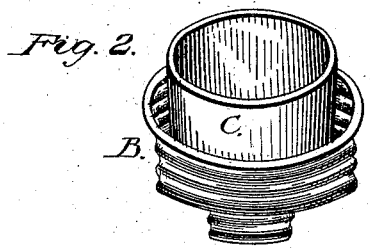
Figure 3:
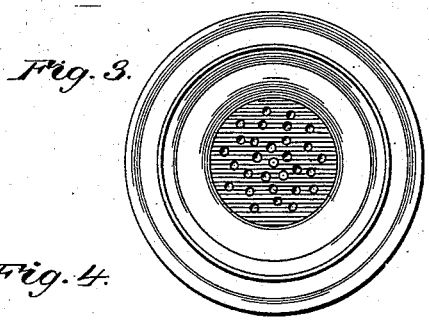
Figure 4:
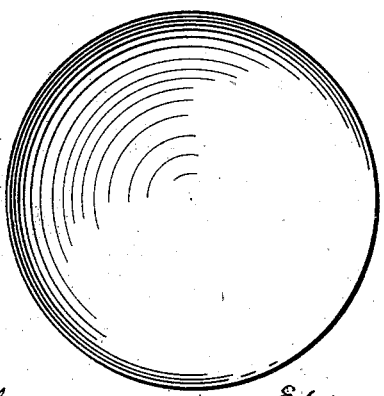

In the accompanying drawings, in which similar letters of reference indicate like parts, Figure 1 is a sectional view of the pail embodying my invention, with lid and stopper in place. Fig. 2 is a perspective of the lid and stopper, showing the cup projecting beyond the screw of the lid which fits into the mouth of the pail or can. Fig. 3 is an inverted plan view of said cup with stopper removed at bottom thereof, showing the perforations of the strainer and the outer rim of the screw-lid, forming a double cup, into which alcohol may be poured and fired for heating the contents of the cup. Fig. 4 shows the bottom of the pail.

The body of the pail A may be made in any of the usual cylindrical forms, with a concave bottom, as shown in Fig. 4, the handle for carriage of the same being affixed thereto by bail-ears in the ordinary manner. The mouth of the pail A, instead of the usual opening of equal dimensions with the body of the pail, is contracted by a shoulder with an upward-projecting rim resembling the mouth of a canister, upon which a cover, B, containing within it and attached to it a cup, C, fits closely by means of a screw-thread formed upon the projecting lip of the mouth and a screw formed upon the outer rim of the cover B, which engages therewith. In screwing the cover B on the mouth of the pail, the cup C, attached thereto, projects downward through the mouth into the interior of the can or pail.

The bottom of the cup C is perforated, so as to form a strainer, as shown in Fig. 3, while the outside of the cover B forms an outer cup, into which alcohol may be poured and fired for heating the contents of the cup.

The strainer is closed and the cup C made water-tight by means of the screw-stopper D.

The operation of this device, and the advantages it possesses over any of the pails now in use, especially for miners, frontiersmen, trappers, and travelers, are obvious. First, purchasing his ground and roasted coffee in said pail as a package, he may boil, strain, and drink his beverage in with and from its several parts, thereby economizing cost, weight, and space in purchase and transportation, or the traveler carrying the pail full of a prepared beverage may, by means of the double cup, at any time, have a hot cup of coffee.

What I claim is—

1. The utensil herein described, consisting of the pail or canister having a dish-shaped bottom and the cover with a cup and strainer attached, substantially as described.

2. The pail A, provided with cover B and cup C, having a perforated bottom and stopper D, all substantially as described.

ETIENNE GUITTARD.

Witnesses:
 CURZ. ROEMER,
 ALBERT E. LAUENSTEIN.